United States Patent
Rehman

Patent Number: 5,730,790
Date of Patent: Mar. 24, 1998

[54] BLACK TO COLOR BLEED CONTROL USING CATIONIC SURFACTANTS

[75] Inventor: Zia Rehman, Corvallis, Oreg.

[73] Assignee: Hewlett-Packard Company, Palo Alto, Calif.

[21] Appl. No.: 631,511

[22] Filed: Apr. 11, 1996

[51] Int. Cl.$^6$ .................................................. C09D 11/02
[52] U.S. Cl. .................... 106/31.59; 106/31.28; 106/31.43; 106/31.85
[58] Field of Search .............. 106/31.28, 31.59, 106/31.43, 31.85

[56] References Cited

U.S. PATENT DOCUMENTS

| | | | |
|---|---|---|---|
| 5,085,698 | 2/1992 | Ma et al. | 106/20 R |
| 5,091,005 | 2/1992 | Mueller et al. | 106/31.43 |
| 5,106,416 | 4/1992 | Moffatt et al. | 106/31.59 |
| 5,116,409 | 5/1992 | Moffatt | 106/22 R |
| 5,198,023 | 3/1993 | Stoffel | 106/22 R |
| 5,221,334 | 6/1993 | Ma et al. | 106/22 D |
| 5,302,197 | 4/1994 | Wickramanayake et al. | 106/22 H |
| 5,320,668 | 6/1994 | Shields et al. | 106/31.28 |
| 5,342,439 | 8/1994 | Lauw | 106/31.59 |
| 5,462,592 | 10/1995 | Murakami et al. | 106/31.59 |
| 5,476,540 | 12/1995 | Shields et al. | 106/31.27 |
| 5,531,817 | 7/1996 | Shileds et al. | 106/31.27 |
| 5,536,306 | 7/1996 | Johnson et al. | 106/31.59 |
| 5,565,022 | 10/1996 | Wickramanayake | 106/31.59 |
| 5,626,655 | 5/1997 | Pawlowski et al. | 106/31.59 |

*Primary Examiner*—Helene Klemanski

[57] ABSTRACT

A set of ink-jet inks and method for reducing bleed are provided in which the ink-jet ink is formulated to comprise at least one dye-based ink-jet ink composition and at least one pigment-based ink-jet ink composition, wherein the dye-based ink-jet ink composition includes at least one cationic surfactant and wherein the pigment-based ink-jet ink composition includes at least one negatively-charged dispersant. Bleed control between the dye-based ink and the pigment-based ink is achieved by the formation of a stable interface formed by the interaction of the negatively-charged dispersant and both the cationic and counterion groups of the cationic surfactant.

24 Claims, 1 Drawing Sheet

BLACK TO COLOR BLEED CONTROL USING CATIONIC SURFACTANTS

TECHNICAL FIELD

The present invention relates to ink-jet inks employed in ink-jet printing, and, more particularly, to the addition of a cationic surfactant, such as a polypropoxy quaternary ammonium acetate, to dye-based ink-jet ink compositions to reduce bleed between adjacently-printed colors.

BACKGROUND ART

Ink-jet printing is as non-impact printing process in which droplets of ink are deposited on a print medium in a particular order to form alphanumeric characters, area fills, and other patterns thereon. Low cost and high quality of output, combined with relatively noise-free operation, have made ink-jet printers a popular alternative to other types of printers used with computers.

The non-impact printing process of ink-jet printing involves the ejection of fine droplets of ink onto a print media such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezo-electric crystals, again, in response to electrical signals generated by the microprocessor.

In commercially-available thermal ink-jet color printers, such as the DeskJet® printer available from Hewlett-Packard Company, a color spectrum is achieved by combining cyan, magenta, and yellow inks in various proportions. A four-pen set including the three primary color inks and a black ink is typically employed in such printers to achieve the necessary color combinations. The cyan, magenta, and yellow inks derive their hues from cyan, magenta, and yellow colorants, respectively.

Colorants for inks are available in the form of dyes or pigments. Accordingly, ink-jet inks are available as either dye-based or pigment-based compositions. Of the two, dye-based ink-jet ink compositions are much more widely available. Dye-based ink-jet ink compositions are generally aqueous-based and are formulated by dissolving: dye in an ink vehicle. The dye molecules employed in ink-jet ink compositions are often in the form of dye salts made of a dye anion and a cation such as sodium or tetramethylammonium (TMA). A limited number of pigment-based ink-jet inks are also available, which generally comprise a pigment dispersed in an aqueous solution by a dispersant. Although pigments offer the very desirable properties of waterfastness and lightfastness, their natural tendency to agglomerate in aqueous media and their lack of uniform size distribution have dampened industry enthusiasm for their employment as ink-jet ink compositions in comparison to dye-based inks.

In application Ser. No. 08/234,209, now abandoned, entitled "Color Ink-Jet Printer with Pigment Black and Dye-Based Color Inks", assigned to the same assignee as the present application, an ink-jet ink set employing an optimum mix of dye-based and pigment-based inks is disclosed and claimed. More specifically, that application discloses employing one print cartridge for dispensing a pigment-based black ink and at least one print cartridge for dispensing at least one water-miscible dye-based ink. Such a color ink-jet printer provides both superior text quality by capitalizing upon the waterfastness and lightfastness of the black pigment-based ink while also achieving relative ease of printer service by employing dye-based color inks.

Regardless of whether an ink is dye-based or pigment-based, ink-jet inks are commonly plagued by the occurrence of bleed. The term "bleed", as used herein, is defined to be the invasion of one color into another, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are dean and free from the invasion of one color into the other.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially-formulated paper is more expensive than "plain" paper. Thus, using external paraphernalia to reduce bleed in ink-jet printing is generally not cost-effective.

Other proposed solutions involve changing the composition of the ink-jet ink to reduce bleed. For example, surfactants have been used to increase the penetration rate of ink into the paper. U.S. Pat. No. 5,116,409, entitled "Bleed Alleviation in Ink-Jet Inks", discloses and claims employing zwitterionic surfactants or ionic or non-ionic amphiphiles at concentrations above their critical micelle concentration to achieve bleed control. However, the addition of surfactants to achieve bleed control has been known to cause a reduction in edge acuity.

A solution to the specific problem of black to yellow color bleed is disclosed in U.S. Pat. No. 5,198,023, entitled "Cationic Dyes with Added Multi-Valent Cations to Reduce Bleed in Thermal Ink-Jet Inks", and assigned to the same assignee as the present application, wherein multivalent cations such as calcium chloride and magnesium chloride are added at concentrations ranging from about 1 to 10 wt. % to yellow cationic inks to prevent bleed between yellow and black inks. Other anions aside from chloride anions include fluoride and nitrate anions. While such multi-valent cations as calcium and magnesium are effective in controlling bleed, they are also instable with a number of dye choices, thereby constraining the formulation of ink-jet ink compositions. Moreover, nitrates are toxic and should therefore be avoided in ink-jet ink compositions.

Another method of reducing bleed between ink-jet inks involves the use of pH-sensitive dyes as disclosed in application Ser. No. 08/567,974, filed Dec. 6, 1995, and entitled "Bleed Alleviation in Ink-Jet Inks Using Organic Acids" and assigned to the same assignee as the present application. It is disclosed therein that one ink-jet ink includes a pH-sensitive colorant and a second ink-jet ink is buffered to an appropriate pH that will induce the precipitation of the. pH-sensitive colorant upon contact therewith. An organic acid at a concentration ranging from about 0.5 to 20 wt. % is employed in the second ink-jet ink to reduce the pH differential required to render insoluble the pH-sensitive colorant. While this means of reducing bleed between two inks is effective, the lower pH required to achieve a sufficient pH differential along with the presence of a free acid may pose material compatibility concerns.

Therefore, a need exists for a means to effectively control bleed between ink-jet inks, particularly black pigment-based inks and color dye-based inks, that allows for greater flexibility in ink formulation, that is relatively non-toxic and non-corrosive to printer parts, and that does not sacrifice edge acuity. Moreover, the means of controlling bleed should be easily implemented and cost-effective.

DISCLOSURE OF INVENTION

In accordance with the invention, a set of ink-jet inks and method for reducing bleed are provided. The ink-jet ink set comprises at least one dye-based ink-jet ink composition and at least one pigment-based ink-jet ink composition, wherein the dyebased ink-jet ink composition includes at least one cationic surfactant and wherein the pigment-based ink-jet ink composition includes at least one negatively-charged component, such as a dispersant. While the cationic surfactant of the dye-based ink is attracted to the negatively-charged dispersant in the pigment-based ink, the interface between the dye-based ink and the pigment-based ink is stabilized by negatively-charged counterions to the cationic surfactant, thereby controlling bleed between the dye-based and pigment-based inks should they be printed adjacently to one another.

Thus, the method of controlling bleed by employing a dye-based ink-jet ink with a cationic surfactant paired with a pigment-based ink having a negatively-charged dispersant overcomes the above-described disadvantages of other bleed control methods. More specifically, the present method does not introduce highly toxic or corrosive components to the ink-jet ink composition. It is easily implemented and cost-effective, particularly in ink-jet printers already employing a black pigment-based ink and dye-based color inks, generally requiring only the addition of a modest amount of cationic surfactant to the dye-based color inks to achieve bleed control between the color inks and the black ink. The edge acuity of the black ink in such an ink set is not sacrificed, since, as a pigment-based ink, it inherently provides better edge acuity than a dye-based ink. Finally, as an additional benefit, the cationic surfactant imparts some degree of bleed control between dye-based inks via the traditional means of using surfactants alone to alleviate bleed.

BEST MODES FOR CARRYING OUT THE INVENTION

Figure 1:
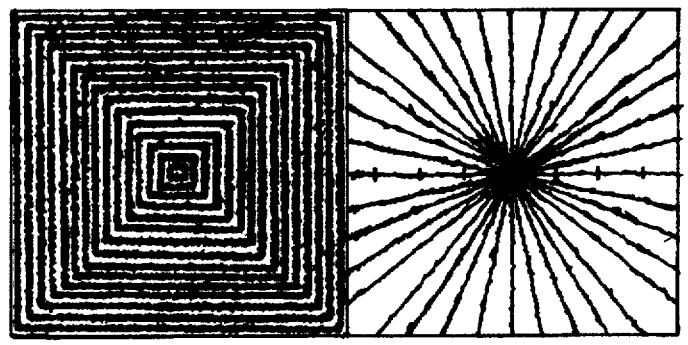
FIG. 1 is a cross-hatching of a dye-based color ink by a pigment-based black ink, with the dye-based color ink exclusive of a cationic surfactant (or any other bleed control component) and therefore outside of the scope of the invention.

The invention described herein is directed to an ink-jet ink set for use with ink-jet color printers, such as Hewlett-Packard's DeskJet® thermal ink-jet printer, to achieve a reduction in bleed. More particularly, the ink-jet ink set comprises at least one dye-based ink-jet ink composition and at least one pigment-based ink-jet ink composition, wherein the dye-based ink-jet ink composition includes at least one cationic surfactant an wherein the pigment-based ink-jet ink composition includes at least one negatively-charged component, e.g., a dispersant. By employing this ink-jet ink set, a reduction in bleed is achieved between the dye-based ink-jet ink and the pigment-based ink-jet ink.

Before specifically addressing the ink components, it should be noted that the purity of all components is that employed in normal commercial practice for ink-jet ink compositions. Weight percents represent percent of the total ink composition, unless otherwise noted.

In accordance with the invention, a cationic surfactant is added to the dyebased ink-jet ink composition. The cationic surfactant should be present in the dyebased ink-jet ink composition at a concentration ranging from about 0.5 to 5 wt. %. A cationic surfactant concentration of less than about 0.5 wt. % would be insufficient to interact with the negatively-charged dispersant to form a stabilized interface, while a concentration of more than about 5 wt. % might adversely affect print quality, such as edge acuity. Preferably, the cationic surfactant is employed in the dye-based ink-jet ink at a concentration of about 3 wt. %.

It is contemplated that any cationic surfactant finding use in ink-jet ink compositions may be employed in the practice of the invention. Examples of cationic surfactants that may be suitably employed in the practice of the invention include, but are not limited to, polypropoxy quaternary ammonium acetates and polypropoxy quaternary ammonium chlorides. Such surfactants are commercially available from, for example, WITCO, Corporation as the Emcol series. More specifically, Emcol CC-55 (MW 3,000) is a polypropoxy quaternary ammonium acetate, while Emcol CC-9 (MW 600), Emcol CC-36 (MW 1,600), and Emcol CC-42 (MW 2,500) are polypropoxy quaternary ammonium chlorides. The molecular weight of these surfactants is directly proportional to their hydrocarbon chain length. A polypropoxy quaternary ammonium acetate surfactant has an acetate counterion, while a polypropoxy quaternary ammonium chloride surfactant has a chloride counterion. It is contemplated that any cationic surfactant associated with an appropriately large counterion might be suitably employed in the practice of the invention. The cationic surfactant component may also comprise a mixture of appropriate cationic surfactants. A polypropoxy quaternary ammonium acetate surfactant, namely Emcol CC-55, is preferred in the practice of the invention.

Examples of large counterions that may be associated with the cationic surfactant in the practice of the invention include, but are not limited to, acetate, formate, chloride, gluconate, succinate, tartrate, glutarate, malonate, carboxylate, fumarate, malate, sebacate, adipate, stearate, oleate, laurate, benzoate, and citrate. Preferably, an acetate counterion is employed.

The molecular weight of the cationic surfactant is an important consideration in formulating the present ink-jet inks. As the molecular weight of the surfactant increases, its charge density decreases, thereby rendering the surfactant more benign to, negatively-charged dyes and, accordingly, less likely to induce the precipitation of such dyes. To reduce charge density in the cationic surfactant, one may add a non-quaternized surfactant precursor to the ink composition. A non-quaternized surfactant precursor, if employed, is preferably added to a 1:1 molar ratio with the charged cationic surfactant.

Optionally, a nonionic surfactant may be used in conjunction with the cationic surfactant in the present ink-jet ink compositions. Examples of nonionic surfactants that may be employed in the present ink-jet ink compositions along with the cationic surfactant include, but are not limited to, secondary alcohol ethoxylates, nonyl phenyl ethoxylates, and acetylene glycol-based nonionics.

A dye-based ink-jet ink composition employing a cationic surfactant will, in accordance with the present invention, achieve a reduction in bleed control when paired with a pigment-based ink-jet ink composition having a negatively-charged dispersant. Without subscribing to any particular theory, the bleed control mechanism achieved in the practice of the invention depends upon the formation of a stable interface between the dye-based and pigment-based inks using interaction between the cationic surfactant and the negative dispersant. More specifically, these surfactants have a positive group and a negative group, of which the positive group is more dominant. For example, Emcol CC-55 has a dominant positive group (i.e., an amine group) and a counterion group (i.e., acetate). The positive group in the cationic surfactant is attracted to the negatively-charged dispersant. However, some of the negatively-charged groups of the cationic surfactant, namely the counterion, dislodge from the surfactant, serving to counteract the attraction between the positive group and the dispersant, thereby forming a stable interface therebetween and preventing the penetration of the inks into one another. At the interface, the surfactant molecules orient themselves such that their dual head groups face toward the pigment-based ink and their hydrophobic tails point away, acting as a barrier against dye-based color inks. Thus, the positively-charged group of the cationic surfactant and the counterion play equally important roles in the method of the invention.

In a preferred embodiment of the invention, an additional amount of the counterion is added to the dye-based ink-jet ink composition to further reduce bleed. For example, if a polypropoxy quaternary ammonium acetate surfactant is employed, an excess amount of acetate ions or other large ions are preferably introduced into the dye-based ink to achieve an even more stable interface between the dye-based ink and the pigment-based ink. Specifically, the addition of excess counterion to the dye-based ink dictates an equilibrium such that the counterions ions adhere to the surfactant rather than dislodge therefrom, so that the entire surfactant goes to the interface with both a positively- and negatively-charged group, thereby resulting in the more stable interface between the dye-based and pigment-based inks. Even if they are dislodged, the large counterions have a tendency to accumulate at the interface. For Emcol CC-55, excess acetate counterion may be provided by adding ammonium acetate to the dye-based ink. It is contemplated that various counterions may be so employed, including the above-provided list of suitable counterions, and that the excess counterion need not be the same counterion already associated with the cationic surfactant. The excess counterion may be appropriately associated with any cation such as commonly contained in ink-jet ink compositions, for example, sodium, lithium, tetramethylammonium, and potassium. Excess counterion is preferably added to the dye-based ink at a concentration of about 2 to 10 wt. % of the ink composition, depending upon the amount of cationic surfactant and the type of counterion added. Routine experimentation by one having ordinary skill in the art would readily result in the determination of an appropriate concentration of excess counterion to add to an ink-jet ink composition.

It is contemplated in the practice of the invention that the colorant of the dye-based ink-jet ink composition may be any water-soluble dye, whether anionic or cationic, suitable for use in ink-jet printers. Examples of anionic dyes include, but are not limited to Food Black 2, Direct Black 19, Acid Blue 9, Direct Blue 199, Direct Red 227, and Acid Yellow 23. Examples of cationic dyes include, but are not limited to, Basic Blue 3, Basic Violet 7, Basic Yellow 13, and Basic Yellow 51. Preferably, a cationic dye is employed in the practice of the invention. The concentration of such a dye preferably ranges from about 0.1 to 7 wt. %. Less than about 0.1 wt. % results in an ink of unacceptable lightness, while greater than about 7 wt. % results in clogging of the orifices in the ink-jet pen. More preferably, the dye is present within the range of about 0.1 to 4 wt. % of the ink-jet ink composition. A mixture of dyes may also be employed.

The vehicles of the dye-based ink-jet inks may comprise such vehicle components found in commercial practice as are compatible with their colorants and other inks in the ink-jet ink set. The vehicle preferably comprises, in addition to the cationic surfactant component, at least one diol, at least one glycol ether, 2-pyrrolidone, "other" components such as surfactants and biocides, a buffer, and water. More specifically, the vehicle of the dye-based ink-jet ink compositions preferably contains the following concentrations, expressed as a percentage of total ink composition: (a) about 3 to 20 wt. % of at least one diol; (b) up to about 5 wt. % of at least one glycol ether; (c) about 3 to 9 wt. % of 2-pyrrolidone; (d) about 0.5 to 5 wt. % of a cationic surfactant; (e) (f) up to about 5 wt. % of at least one component selected from the group consisting of nonionic surfactants, biocides, and buffers, the buffer being added in a sufficient amount to achieve the selected ink pH; (g) and the balance water. While the above-described vehicle formulation is preferred, any aqueous-based vehicle suitable for ink-jet ink compositions may be benefited in the practice of the invention.

Examples of diols that may be suitably employed in the ink vehicle of the dyebased ink include any of, or a mixture of two or more of, such compounds as ethanediols (e.g., 1,2-ethanediol); propanediols (e.g., 1,2-propanediol, 1,3-propanediol, 2-ethyl-2-hydroxy-methyl-1,3-propanediol, ethylhydroxy-propanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably, 1,5-pentanediol and EHPD are employed in the vehicle of the dye-based ink.

The glycol ether component of the ink vehicle of the dye-based ink may comprise any of the glycol ethers and thioglycol ethers commonly employed in the inks used in ink-jet printing, or a mixture thereof. Examples of such compounds include polyalkylene glycols such as polyethylene glycols (e.g., diethylene glycol, triethylene glycol, tetraethylene glycol, etc.); polypropylene glycols (e.g., dipropylene glycol, tripropylene glycol, tetrapropylene glycol, etc.); polymeric glycols (e.g., PEG 200, PEG 300, PEG 400, PPG 400, etc.); and thiodiglycol. Preferably, diethylene glycol is employed in the ink vehicle.

The preferred concentration of pentanediol and glycol component in each dye-based ink is given by the formula $$2=[DEG]+[pentanediol]=about\ 6\ to\ 10\ wt.\ \%,$$

where the square brackets denote the concentration in weight percent. EHPD is considered separately and is preferably present in the dye-based ink in an amount in the range of about 6 to 9 wt. %.

Consistent with the requirements for this invention, various other types of additives may be employed in the dye-based and pigment-based ink-jet ink compositions to optimize the properties of the ink composition for specific applications. Examples of such additives include buffers, biocides, and the like, each of which are commonly employed additives in ink-jet ink compositions. Examples of preferably-employed buffers include, but are not limited to, Trizma Base, which is available from Aldrich Chemical (Milwaukee, Wis.), and 4-morpholine ethane sulfonic acid (MES). Any of the biocides commonly employed in ink-jet inks may be employed in the practice of the invention, such as NUOSEPT 95, available from Hüls America Piscataway, N.J.); PROXEL GXL, available from ICI Americas (Wilmington, Del.); and glutaraldehyde, available from Union Carbide Company (Bound Brook, N.J.) under the trade designation UCARCIDE 250. PROXEL GXL is the preferred biocide.

Anti-kogation of the inks is achieved by well-known substitution of cations on certain dyes with other cations. For example, sodium cations associated with both Direct Blue 199 and Acid Yellow 23 are substantially totally replaced with tetramethyl ammonium (TMA) cations.

An example of a dye-based ink-jet ink composition that is formulated in accordance with the invention to include a cationic surfactant is the following cyan dye-based ink: (a) about 2 to 4 wt. % of a mixture of Acid Blue 9 associated with sodium and Direct Blue 199 associated with TMA;(b) about 8 wt. % 1,5-pentanediol; (c) about 7.5 wt. % EHPD; (d) about 7.5 wt. % of 2-pyrrolidone; (e) about 4 wt. % of Emcol CC-55; (f) about 2 wt. % of ammonium acetate; (g) sufficient tetramethylammonium hydroxide to buffer the pH to about 7.0; and (h) the balance water.

With regard to the pigment-based ink-jet ink compositions of the present invention, the negatively-charged component employed therein may be any such dispersant suitably employed in a pigment-based ink-jet ink composition. An example of a negatively-charged dispersant includes, but is not limited to, the polyacrylic dispersant, in the black pigment-based ink having a proprietary composition that is employed in Hewlett-Packard's DeskJet 850® ink-jet printer. Preferably, the negatively-charged dispersant is employed at a concentration within the range of about 1 to 3 wt. % of the pigment-based ink-jet ink composition, and most preferably about 2 wt. %.

It is contemplated in the practice of the invention that the colorant of the pigment-based ink-jet ink composition may be any pigment suitable for use in ink-jet printers that requires the presence of a dispersant. An example of such a pigment includes, but is not limited to, the pigment in the proprietary black pigment-based ink composition employed in Hewlett-Packard's DeskJet 850® ink-jet printer. The concentration of such a pigment preferably ranges from about 1 to 5 wt. % of the ink-jet ink composition. Less than about 1 wt. % results in an ink of unacceptable lightness, while greater than about 5 wt. % results in clogging of the orifices in the ink-jet pen. More preferably, the pigment is present within the range of about 3 to 4 wt. % of the ink-jet ink composition. A mixture of pigments may also be employed.

The vehicles of the pigment-based ink-jet inks may comprise such vehicle components found in commercial practice as are compatible with their colorants and other inks in the ink-jet ink set. To illustrate, suitable black pigment-based inks are disclosed and claimed, for example, in U.S. Pat. No. 5,085,698, entitled "Aqueous Pigmented Inks for Ink Jet Printers", in U.S. Pat. No. 5,221,334, entitled "Aqueous Pigmented Inks for Ink Jet Printers", and in U.S. Pat. No. 5,302,197, entitled "Ink Jet Inks", all assigned to E.I. Du Pont de Nemours and Company. A specific example of a pigment-based black ink having a proprietary composition that is commercially available is the black ink employed in Hewlett-Packard's DeskJet 850® ink-jet printer.

While the method of the present invention may be employed to reduce or eliminate bleed between any colors of dye-based or pigment-based inks, it is expected to find greatest use in preventing black to color bleed and color to color bleed, since color to black bleed is virtually unnoticeable. Moreover, presently-available pigment-based ink-jet inks have black colorants, as opposed to primary colors. Therefore, it is contemplated that the invention will be practiced such that the black ink in an ink set is formulated to be a pigment-based ink containing a negatively-charged dispersant while the color ink (namely magenta, cyan, or yellow) will be formulated to be a dye-based ink containing a cationic surfactant. More preferably, each of the color inks of an ink-jet ink set are dye-based inks including a cationic surfactant in accordance with the invention while the black ink is a pigment-based ink-jet ink including a negatively-charged dispersant. It follows that black to color bleed will have been substantially eliminated in such an ink set. Additional benefits to such an ink set include (1) improved edge acuity in printed text deriving from employing a pigment-based black ink as opposed to a dye-based black ink, and (2) bleed alleviation between the dye-based color inks by the simple presence of the cationic surfactant in accordance with traditional methods of employing a surfactant for bleed control.

In sum, the present method involves modification of at least two ink formulations to bring about the desired effect of bleed control therebetween. The cationic surfactant is incorporated into the dye-based ink-jet ink composition, whereas the negatively-charged dispersant is incorporated into the pigment-based ink-jet ink composition. The cationic surfactant and negatively-charged dispersant interact to form a stabilized interface that is substantially impenetrable by either the dye-based or pigment-based inks, thereby achieving bleed control therebetween.

The advantages realized in the practice of the invention are illustrated in the examples below.

EXAMPLES

The figures illustrate the efficacy of a combination of cationic surfactants and negatively-charged dispersants in achieving bleed control between dye-based and pigment-based ink-jet inks. While any combination of color and black inks might have been used to illustrate the benefits of practicing the invention, yellow and black inks were employed for their contrast so that bleed would be readily observable. Hewlett-Packard's DeskJet 850® printer was employed to deposit the ink-jet inks onto print medium for evaluation of the bleed control achieved in the practice of the invention. In each case, the black ink is a pigment-based black ink having a proprietary composition that is presently employed in Hewlett-Packard's DeskJet 850® printer, the ink having a pH of about 8.5.

To first illustrate the problem of black to color bleed addressed by the method of the invention, FIG. 1 depicts the black to color bleed that occurs in the absence of any bleed control measure. More specifically, FIG. 1 depicts a yellow area overprinted by the above-described black ink on Gilbert bond paper, with the white area of the figure representing the yellow area fill. The yellow ink had the following composition: (a) about 2.1 wt. % Acid Yellow 23-TMA (ABS at 1:10.000 dilution); (b) about 8 wt. % 1,5-pentanediol; (c) about 7.5 wt. % EHPD; (d) about 7.5 wt. % 2-pyrrolidone; and (e) the balance water. Without any bleed control components such as inorganic salts, organic acids, or cationic surfactants, there is substantial bleed between the black and yellow inks as shown in FIG. 1, evident in the ragged border between the black and yellow inks therein.

Figure 2:
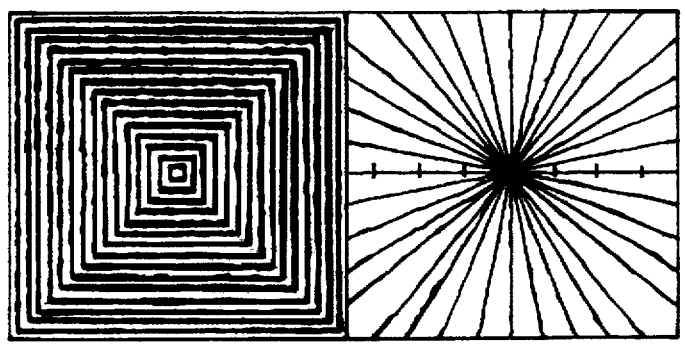
FIG. 2 is a cross-hatching of a dye-based color ink by a pigment-based black ink, with the dye-based color ink including a cationic surfactant in accordance with the invention.

FIG. 2 represents the bleed control achieved between the above-described black ink and a yellow ink formulated in accordance with the invention. More specifically, about 4 wt. % Emil CC-55 cationic surfactant was added to the above-described dye-based ink (replacing the same amount of water). The border between the black and yellow inks improved significantly as a result.

Figure 3:
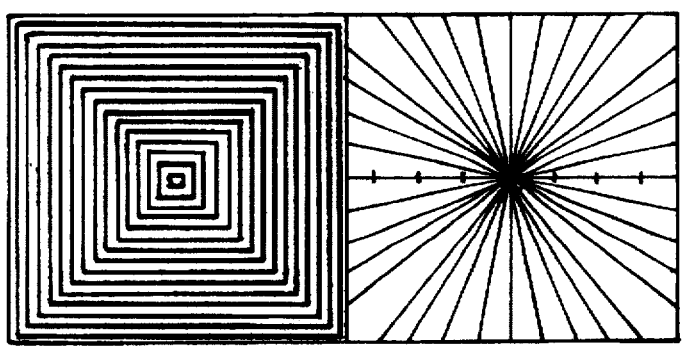
FIG. 3 is a cross-hatching of a dye-based color ink by a pigment-based black ink, with the dye-based color ink including both a cationic surfactant and excess counterion in a preferred embodiment of the invention.

FIG. 3 represents the even greater improvement in bleed control achieved when the yellow ink of FIG. 2 is spiked with an additional 2 wt. % ammonium acetate. Clearly, the addition of an excess of acetate counterion further improved the bleed control achieved by employing a cationic surfactant in the yellow dye-based ink.

Figure 4:
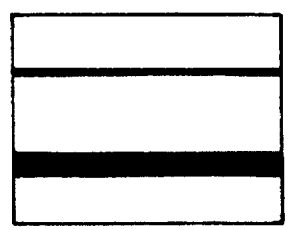
FIGS. 4 and 5 are line drawings illustrating the bleed control achieved with the ink of FIG. 3 as printed on Hewlett-Packard glossy media and Hewlett-Packard transparency media, respectively.
Figure 5:
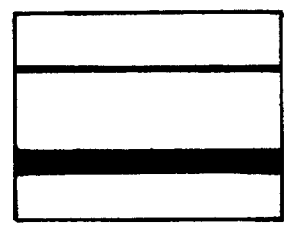

Finally, FIGS. 4 and 5 illustrate the effects of printing the inks of FIG. 3 on a different medium. More specifically, FIG. 4 represents the inks of FIG. 3 having been printed onto Hewlett-Packard's glossy media, while FIG. 5 represents the inks of FIG. 3 having been printed onto Hewlett-Packard's transparency media. It is noted that the transparency consists of three layers: a top layer of polyvinyl pyrrolidone and acrylate copolymer with a quaternary amine; the middle layer is hydroxyl ethyl cellulose; and the bottom layer is the base polymer of polyethylene terephthalate. The print quality of the ink-jet ink set made in accordance with the invention is good and the bleed is controlled on these two different print media.

Thus, it has been demonstrated that the addition of a cationic surfactant to a dye-based ink that is paired with a pigment-based ink having a negatively-charged dispersant achieves substantial bleed control therebetween. It is also demonstrated that the further addition of excess counterion further improves the bleed control achieved with the addition of a cationic surfactant alone to the dye-based ink.

INDUSTRIAL APPLICABILITY

The present ink-jet ink composition and method disclosed herein for controlling bleed between adjacently-printed inks are expected to find commercial use in ink-jet printers, particularly thermal ink-jet color printers.

Thus, there has been disclosed herein an ink-jet ink set comprising a dye-based ink-jet ink including a cationic surfactant, namely a polypropoxy quaternary ammonium surfactant, and a pigment-based ink-jet ink including a negatively-charged dispersant. Additionally, a method for reducing bleed by formulating the same ink-jet ink set is disclosed. It will be readily apparent to those skilled in the art that various changes art modifications of an obvious nature may be made without departing from the spirit of the invention, and all such changes and modifications are considered to fall within the scope of the invention as defined by the appended claims.

What is claimed is:

1. An ink-jet ink set for ink-jet printing comprising at least one dye-based ink-jet ink composition and at least one pigment-based ink-jet ink composition, wherein said at least one dye-based ink-jet ink composition includes at least one cationic surfactant and wherein said at least one pigment-based ink-jet ink composition includes at least one negatively-charged component.

2. The ink-jet ink set of claim 1 wherein said at least one cationic surfactant is present in said at least one dye-based ink-jet ink composition at a concentration ranging from about 0.5 to 5 wt. %.

3. The ink-jet ink set of claim 1 wherein said at least one cationic surfactant is selected from the group consisting of polypropoxy quaternary ammonium acetates and polypropoxy quaternary ammonium chlorides.

4. The ink-jet ink set of claim 1 wherein said at least one cationic surfactant comprises an anion and a counterion and wherein said at least one dye-based ink-jet ink composition further includes a second counterion in addition to that associated with said at least one cationic surfactant.

5. The ink-jet ink set of claim 4 wherein said second counterion is selected from the group consisting of acetate, formate, chloride, gluconate, succinate, tartrate, glutarate, malonate, carboxylate, fumarate, malate, sebacate, adipate, stearate, oleate, laurate, benzoate, and citrate.

6. The ink-jet ink set of claim 4 wherein said second counterion is present in said at least one dye-based ink-jet ink composition at a concentration within the range of about 2 to 10 wt. %.

7. The ink-jet ink set of claim 1 wherein said at least one dye-based ink-jet ink composition further includes a non-quartered surfactant precursor to said at least one cationic surfactant.

8. The ink-jet ink set of claim 1 wherein said at least one dye-based ink-jet ink comprises about 0.1 to 4 wt. % of at least one dye, about 3 to 20 wt. % of at least one diol, 0 to about 5 wt. % of at least one glycol ether, about 3 to 9 wt. % of 2-pyrrolidone, about 0.5 to 5 wt. % of a cationic surfactant, up to about 5 wt. % of at least one component selected from the group consisting of nonionic surfactants, biocides and buffers, and water.

9. The ink-jet ink set of claim 1 wherein said at least one dye is selected from the group consisting of Basic Blue 3, Basic Violet 7, Basic Yellow 13, and Basic Yellow 51.

10. The ink-jet ink set of claim 1 wherein said at least one negatively-charged component is present in said at least one pigment-based ink-jet ink composition within the range of about 1 to 3 wt. %.

11. The ink-jet ink set of claim 1 wherein said at least one negatively-charged component is a polyacrylic pigment dispersant.

12. The ink-jet ink set of claim 1 wherein said at least one pigment-based ink-jet ink composition comprises a black pigment-based ink-jet ink and wherein said at least one dye-based ink-jet ink composition comprises a magenta dye-based ink-jet ink, a cyan dye-based ink-jet ink, and a yellow dye-based ink-jet ink.

13. A method of reducing bleed in printing at least two different color inks onto a print medium from an ink-jet pen, said at least two different inks comprising at least one dye-based ink-jet ink composition and at least one pigment-based ink-jet ink composition, said method comprising the steps of formulating said at least one dyebased ink-jet ink composition to include at least one cationic surfactant and formulating said at least one pigment-based ink-jet ink composition to include at least one negatively-charged component.

14. The method of claim 13 wherein said at least one cationic surfactant is present in said dye-based ink-jet ink composition at a concentration ranging from about 0.5 to 5 wt. %.

15. The method of claim 13 wherein said at least one cationic surfactant is selected from the group consisting of polypropoxy quaternary ammonium acetates and polypropoxy quaternary ammonium chlorides.

16. The method of claim 13 wherein said at least one cationic surfactant comprises an anion and a counterion and wherein said at least one dye-based ink-jet ink composition further includes a second counterion in addition to that associated with said at least one cationic surfactant.

17. The method of claim 16 wherein said second counterion is selected from the group consisting of acetate, formate, chloride, gluconate, succinate, tartrate, glutarate, malonate, carboxylate, fumarate, malate, sebacate, adipate, stearate, oleate, laurate, benzoate, and citrate.

18. The method of claim 16 wherein said second counterion is present in said at least one dye-based ink-jet ink composition at a concentration within the range of about 2 to 10 wt. %.

19. The method of claim 13 wherein said at least one dye-based ink-jet ink composition is formulated to further include a non-quarterized surfactant precursor to said at least one cationic surfactant.

20. The method of claim 13 wherein said at least one dye-based ink-jet ink comprises about 0.1 to 4 wt. % of at least one dye, about 3 to 20 wt. % of at least one diol, 0 to about 5 wt. % of at least one glycol ether, about 3 to 9 wt. % of 2-pyrrolidone, about 0.5 to 5 wt. % of a cationic surfactant, up to about 5 wt. % of at least one component selected from the group consisting of nonionic surfactants, biocides and buffers, and water.

21. The method of claim 13 wherein said at least one dye is selected from the group consisting of Basic Blue 3, Basic Violet 7, Basic Yellow 13, and Basic Yellow 51.

22. The method of claim 13 wherein said at least one negatively-charged component is present in said at least one pigment-based ink-jet ink composition within the range of about 1 to 3 wt. %.

23. The method of claim 13 wherein said at least one negatively-charged component is a polyacrylic pigment dispersant.

24. The method of claim 13 wherein said at least one pigment-based ink-jet ink composition comprises a black pigment-based ink-jet ink and wherein said at least one dye-based ink-jet ink composition comprises a magenta dye-based ink-jet ink, a cyan dye-based ink-jet ink, and a yellow dye-based ink-jet ink.

* * * * *

UNITED STATES PATENT AND TRADEMARK OFFICE
CERTIFICATE OF CORRECTION

PATENT NO.   : 5,730,790
DATED        : March 24, 1998
INVENTOR(S)  : Rehman

It is certified that error appears in the above-identified patent and that said Letters Patent is hereby corrected as shown below:

Column 10,
Line 24, delete "quartered" and insert therefor -- quaternized --.

Column 11,
Line 17, delete "non-quarterized" and insert therefor -- non-quaternized --.

Signed and Sealed this

Twenty-eighth Day of October, 2003

JAMES E. ROGAN
*Director of the United States Patent and Trademark Office*